(12) United States Patent
Richards

(10) Patent No.: US 10,809,429 B1
(45) Date of Patent: Oct. 20, 2020

(54) ANGLE SELECTIVE FILTER HAVING CURVED SURFACE FOR NEAR EYE DISPLAYS

(71) Applicant: Facebook Technologies, LLC, Menlo Park, CA (US)

(72) Inventor: Evan M. Richards, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 78 days.

(21) Appl. No.: 15/884,293

(22) Filed: Jan. 30, 2018

Related U.S. Application Data

(63) Continuation of application No. 15/867,652, filed on Jan. 10, 2018, now abandoned.

(51) Int. Cl.
| | | |
|---|---|---|
| G02B 3/08 | (2006.01) | |
| G02B 5/20 | (2006.01) | |
| G02B 5/28 | (2006.01) | |
| G02B 27/01 | (2006.01) | |
| G02B 27/00 | (2006.01) | |

(52) U.S. Cl.
CPC ............ *G02B 5/208* (2013.01); *G02B 3/08* (2013.01); *G02B 27/0093* (2013.01); *G02B 5/281* (2013.01); *G02B 5/285* (2013.01); *G02B 27/0018* (2013.01); *G02B 2027/0187* (2013.01); *G02B 2207/123* (2013.01)

(58) Field of Classification Search
CPC ............... G02B 1/11–118; G02B 3/08; G02B 5/20–289; G02B 17/006; G02B 19/0019; G02B 27/0018; G02B 27/0093; G02B 27/0101; G02B 2027/013; G02B 2027/0138; G02B 2027/154; G02B 2027/0161; G02B 27/0172; G02B 27/0176; G02B 2027/178; G02B 27/0179; G02B 2027/0181; G02B 2027/0187; G02B 2027/0194; G02B 2027/0198; G02B 2207/123; H01J 29/896
USPC ............ 359/13, 14, 35, 577–590, 601–614, 359/630–633, 885–892
See application file for complete search history.

(56) References Cited

U.S. PATENT DOCUMENTS

| | | | |
|---|---|---|---|
| 2009/0015929 A1* | 1/2009 | DeJong ............. | G02B 27/0081 359/633 |
| 2010/0060857 A1* | 3/2010 | Richards ............... | G02B 27/22 353/7 |
| 2012/0120498 A1* | 5/2012 | Harrison .................. | G02B 3/08 359/630 |
| 2013/0077049 A1* | 3/2013 | Bohn ....................... | G02B 5/20 351/210 |
| 2013/0128364 A1* | 5/2013 | Wheeler ................ | A61B 3/113 359/630 |
| 2017/0010465 A1* | 1/2017 | Martinez ............ | G02B 27/0172 |

(Continued)

*Primary Examiner* — Ryan S Dunning
(74) *Attorney, Agent, or Firm* — Artegis Law Group, LLP

(57) ABSTRACT

One embodiment sets forth a near eye display (NED). The NED includes an electronic display configured to output image light to an optical element. The optical element is configured to receive the image light, direct the image light, and form an image at the eye. The NED also includes an angle selective filter having a curved surface. The angle selective filter is configured to filter out light beams of light exiting the optical element and having an angle of incidence on the curved surface larger than a cut-off angle of incidence.

18 Claims, 12 Drawing Sheets

(56) References Cited

U.S. PATENT DOCUMENTS

| | | | |
|---|---|---|---|
| 2017/0269428 A1* | 9/2017 | Otani | F21V 5/007 |
| 2017/0357093 A1* | 12/2017 | Dobschal | G02B 27/0172 |

\* cited by examiner

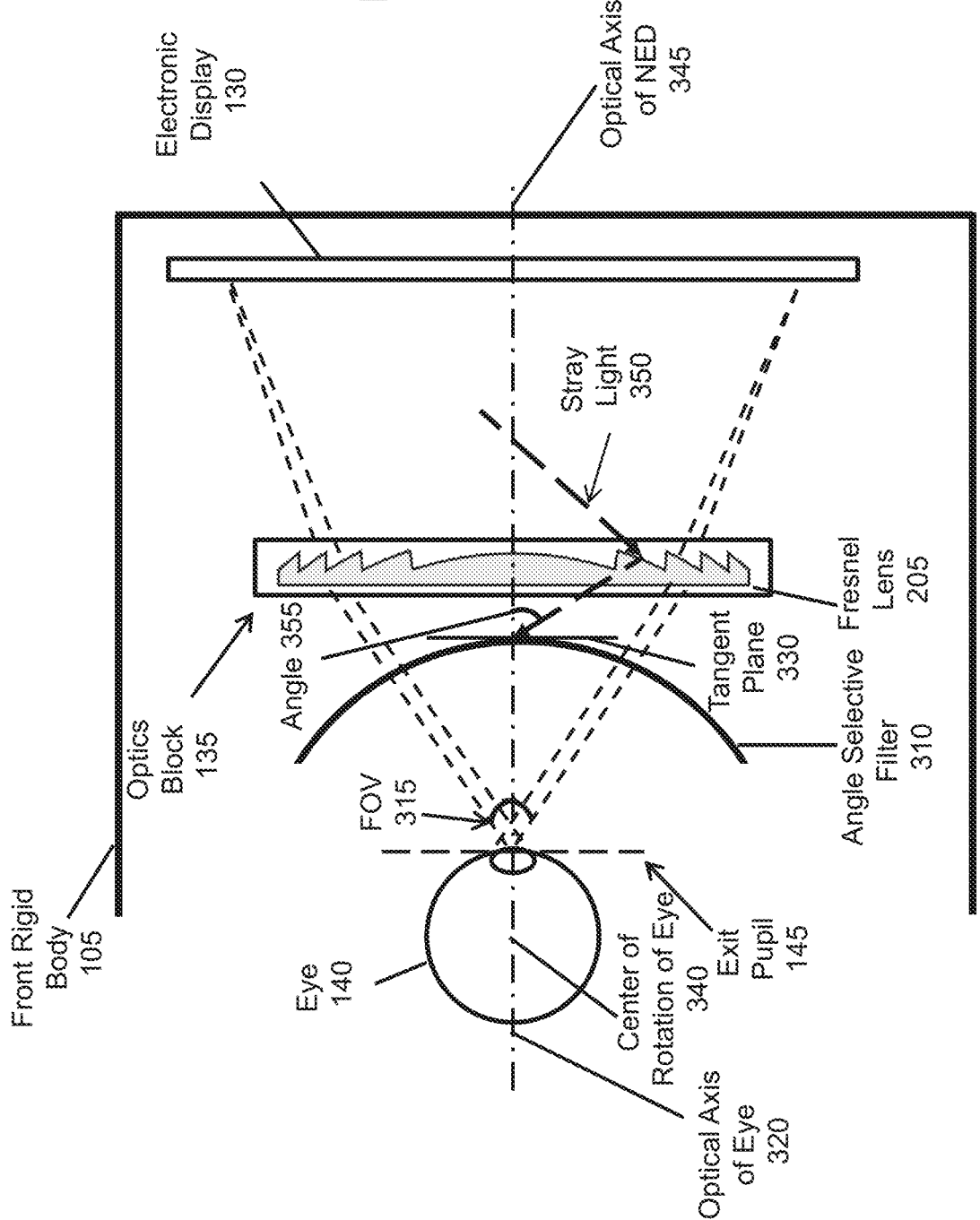

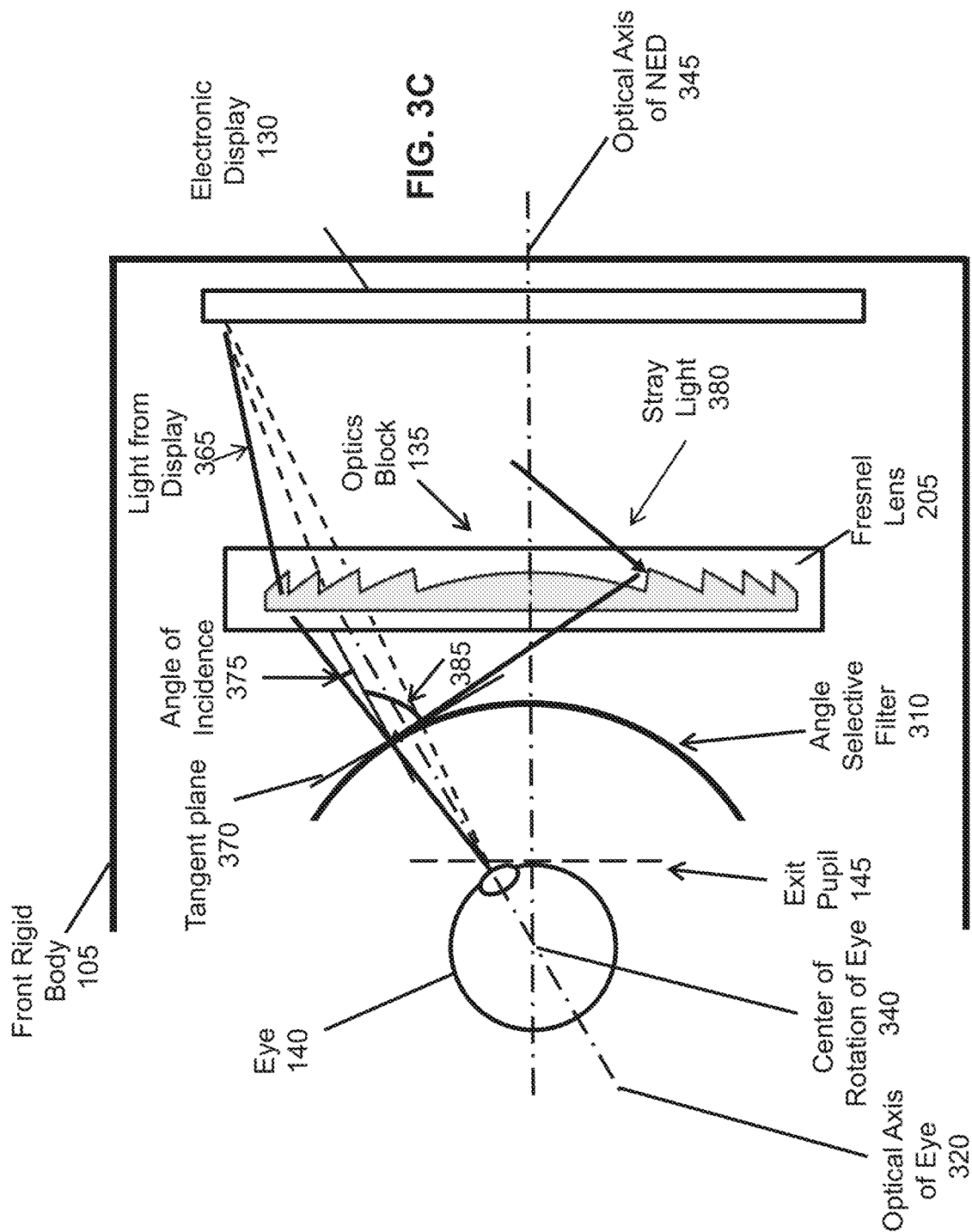

ANGLE SELECTIVE FILTER HAVING CURVED SURFACE FOR NEAR EYE DISPLAYS

CROSS-REFERENCE TO RELATED APPLICATIONS

This application is a continuation of the co-pending U.S. patent application titled, "ANGLE SELECTIVE FILTER FOR NEAREYE DISPLAYS," filed on Jan. 10, 2018 and having Ser. No. 15/867,652. The subject matter of this related application is hereby incorporated herein by reference.

BACKGROUND OF THE INVENTION

Field of the Invention

Embodiments of the present invention relate generally to near eye displays, and, more specifically, to an angle selective filter for reducing stray light in near eye displays.

Description of the Related Art

Virtual reality (VR) near eye displays (NEDs) can be used to simulate virtual environments. For example, stereoscopic images can be displayed on an electronic display inside the NED to simulate the illusion of depth. Further, head tracking sensors can be used to estimate what portion of the virtual environment is being viewed by the user.

For NEDs, stray light within the NED can interfere with the viewing experience of user of the NED. Stray light can be caused by surface defects, dust, or any other object in the imaging path that may cause light to deviate from the intended imaging path. For example, a Fresnel lens can be used in the NED for increased optical performance. A Fresnel lens in the NED, however, can introduce stray light as a result of the faceted and discontinuous nature of the intended refracting surface of the lens. Additionally, stray light may be caused by unwanted reflections off various optical or mechanical surfaces.

Stray light is distracting for the user of the NED and thus breaks VR immersion. In addition, stray light can reduce the contrast of an image being viewed by the user and, in some cases, causes glare dots or patterns to become visible on the image. The presence of stray light in the NED thus decreases the quality of the images presented to the user and, consequently, negatively impacts the overall VR viewing experience.

As the foregoing illustrates, what is needed in the art is a technique for reducing stray light in NEDs.

SUMMARY OF THE INVENTION

One embodiment of the present invention sets forth a near eye display (NED). The NED includes an electronic display configured to output image light. Further, the NED includes an optical element configured to receive the image light, direct the image light, and form an image at an eye-box. The NED also includes an angle selective filter having a curved surface. The angle selective filter is configured to filter out light beams of the image light with an angle of incidence on the curved surface larger than a cut-off angle of incidence.

One advantage of the disclosed techniques is that the angle selective filter blocks stray light beams in the NED from reaching the eye box. The reduction in the stray light beams results in the reduction of glare dots or glare parents on the images generated at the eye. Further, the angle selective filter is configured such the amount of stray light beams that are blocked when the optical axis of the eye aligns with the optical axis of the NED is substantially similar to the amount of stray light beams that are blocked when the optical axis of the eye is not aligned with the optical axis of the NED. In this way, as the eye of the user can rotate around the center of rotation, the images being viewed remain at about a similar level of quality with a similar level of reduction of the stray light beams. Accordingly, the user of the NED has a consistent and comfortable immersion viewing experience while using the NED.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3C are illustrations of a cross-sectional view of the NED including the optics block and an angle selective filter configured to block stray light beams, according to various embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

Configuration Overview

A near eye display (NED) includes an angle selective filter that is configured to filter out light beams of image light. The angle selective filter is configured to allow only light beams having angles of incidences on the filter that are less than a cut-off angle to pass through the filter. Thus, light beams having angles of incidences on the filter that are larger than the cut-off angle are filtered out and do not reach the eye of the user of the NED. The angle selective filter includes a curved surface, for example, a spherical surface, where a center of the spherical surface corresponds to a center of rotation of the eye. Thus, when the eye rotates such that the optical axis of the eye aligns with a given point on the spherical surface, a tangent plane of the point on the spherical surface is normal to the optical axis of the eye.

Advantageously, the angle selective filter with the curved surface can significantly reduce the stray light beams in the NED, thus reducing the number of glare dots or glare patterns on the images generated at the eye. More specifically, the angle selective filter is configured such the amount of stray light beams that are blocked when the optical axis of the eye aligns with the optical axis of the NED is substantially similar to the amount of stray light beams that are blocked when the optical axis of the eye is not aligned with the optical axis of the NED. In this way, as the eye of the user can rotate around the center of rotation, the images being viewed remain at about a similar level of quality with a similar level of reduction of the stray light beams.

System Overview

Figure 1A:
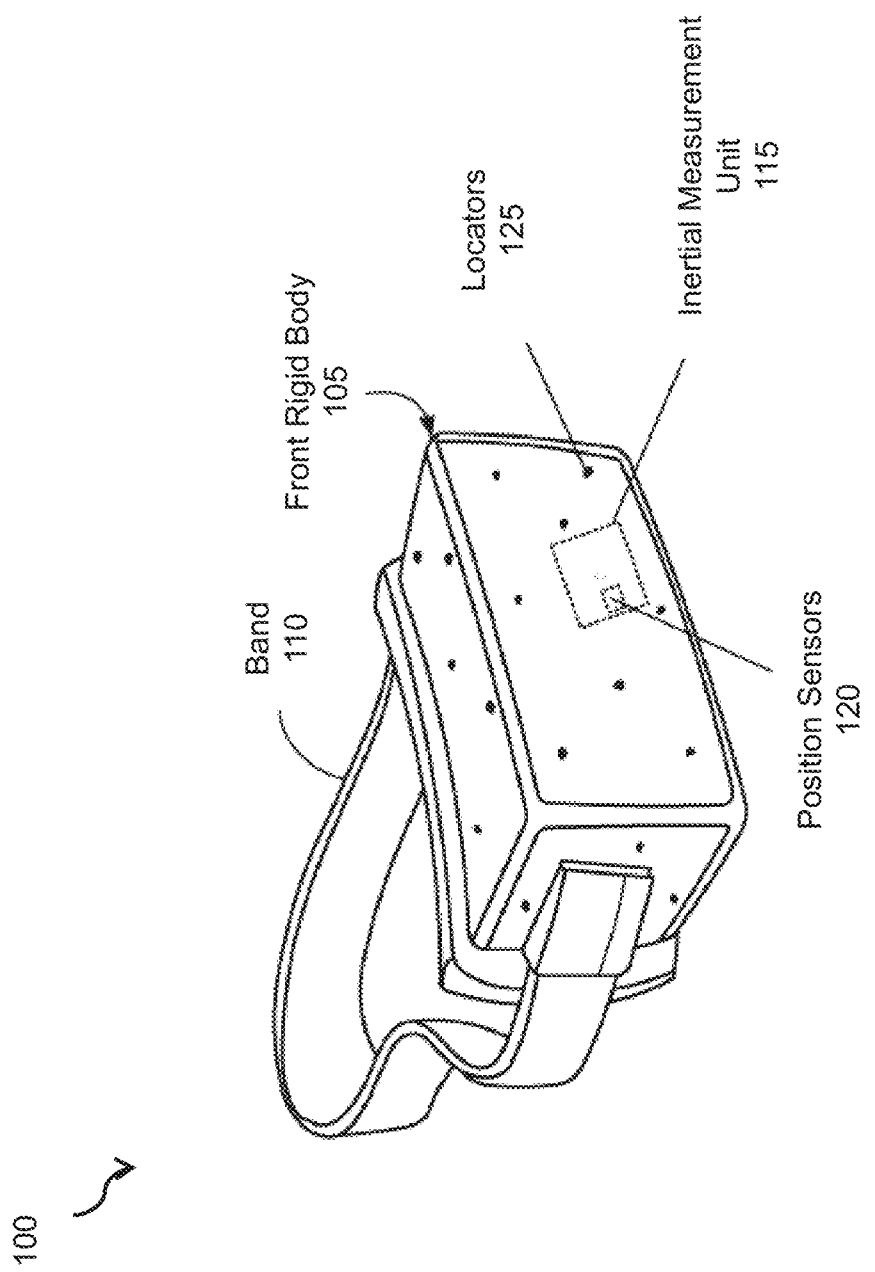
FIG. 1A is a wire diagram of a near eye display (NED), according to an embodiment.

FIG. 1A is a wire diagram of a near eye display (NED) 100, according to an embodiment. The NED 100 includes a front rigid body 105 and a band 110. The front rigid body 105 includes one or more electronic display elements of an electronic display (not shown), an IMU 115, one or more position sensors 120, and locators 125. In the embodiment shown by FIG. 1A, the position sensors 120 are located within the IMU 115, and neither the IMU 115 nor the position sensors 120 are visible to the user. The IMU 115, the position sensors 120, and the locators 125 are discussed in detail below with regard to FIG. 8. Note in embodiments, where the NED 100 acts as an AR or MR device, portions of the NED 100 and its internal components are at least partially transparent.

Figure 1B:
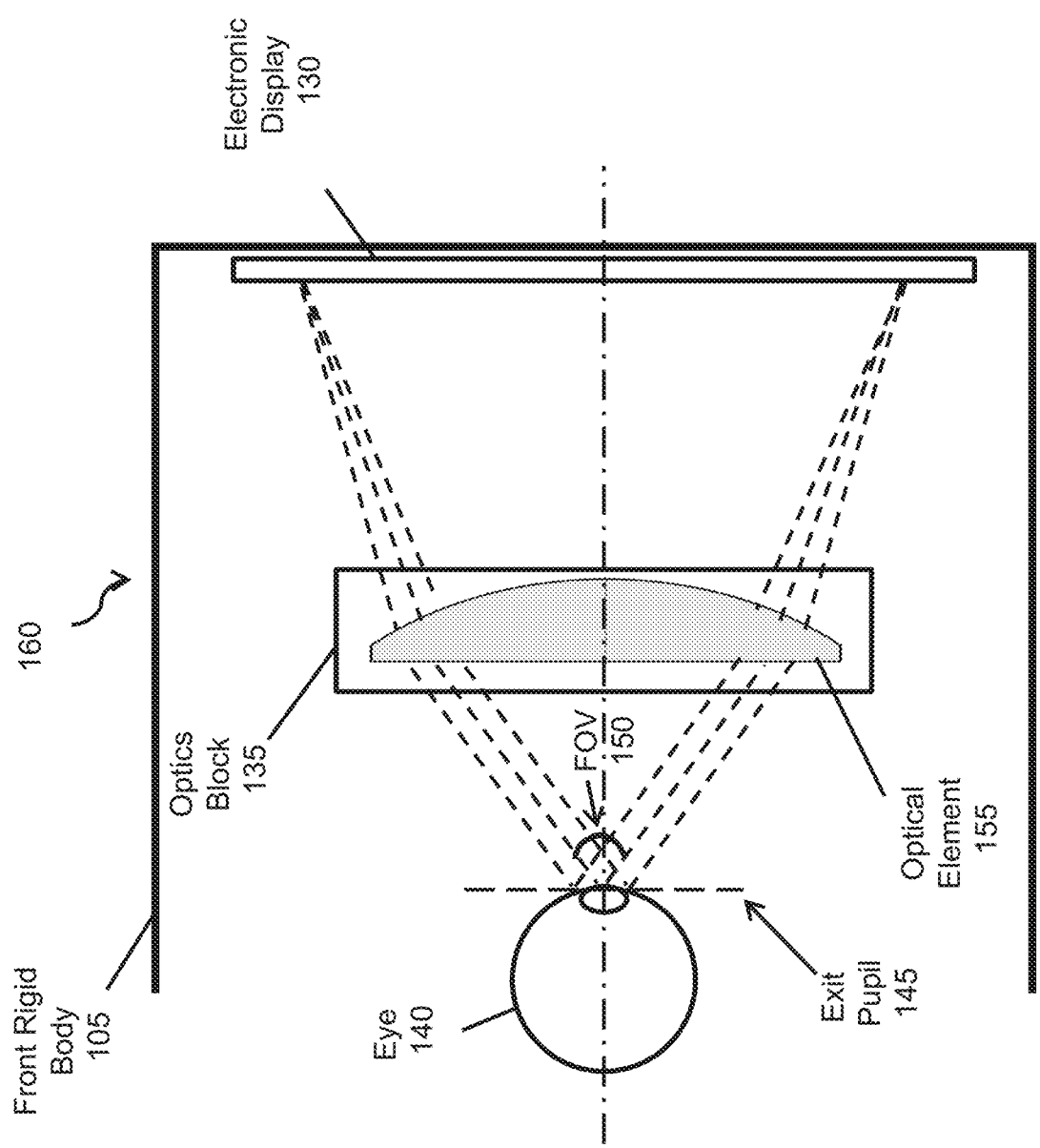
FIG. 1B is a cross section of the front rigid body of the embodiment of the NED shown in FIG. 1A.

FIG. 1B is a cross section 160 of the front rigid body 105 of the embodiment of the NED 100 shown in FIG. 1A. As shown in FIG. 1B, the front rigid body 105 includes an electronic display 130 and an optics block 135 that together provide image light to an exit pupil 145. The exit pupil 145 is the location of the front rigid body 105 where a user's eye 140 is positioned. For purposes of illustration, FIG. 1B shows a cross section 160 associated with a single eye 140, but another optics block, separate from the optics block 135, provides altered image light to another eye of the user. Additionally, the NED 100 includes an eye tracking system (not shown in FIG. 1B). The eye tracking system may include one or more sources that illuminate one or both eyes of the user. The eye tracking system may also include one or more cameras that capture images of one or both eyes of the user to track the positions of the eyes.

The electronic display 130 displays images to the user. In various embodiments, the electronic display 130 may comprise a single electronic display or multiple electronic displays (e.g., a display for each eye of a user). Examples of the electronic display 130 include: a liquid crystal display (LCD), an organic light emitting diode (OLED) display, an active-matrix organic light-emitting diode display (AMO-LED), a QOLED, a QLED, some other display, or some combination thereof.

The optics block 135 adjusts an orientation of image light emitted from the electronic display 130 such that the electronic display 130 appears at particular virtual image distances from the user. The optics block 135 is configured to receive image light emitted from the electronic display 130 and direct the image light to an eye-box associated with the exit pupil 145. The image light directed to the eye-box forms an image at a retina of the eye 140. The eye-box is a region defining how much the eye 140 moves up/down/left/right from without significant degradation in the image quality. As shown in FIG. 1B, a field of view (FOV) 150 is the extent of the observable world that is seen by the eye 140 at any given moment.

Additionally, in some embodiments, the optics block 135 magnifies received light, corrects optical errors associated with the image light, and presents the corrected image light to the eye 140 of user of the NED 100. The optics block 135 may include one or more optical elements 155 in optical series. An optical element 155 may be an aperture, a Fresnel lens, a convex lens, a concave lens, a filter, or any other suitable optical element 155 that affects the image light. Moreover, the optics block 135 may include combinations of different optical elements. In some embodiments, one or more of the optical elements in the optics block 135 may have one or more coatings, such as anti-reflective coatings. The optics block 135 is discussed in greater detail in conjunction with FIGS. 2A-7.

Filtering Stray Light in a Near Eye Display

Figure 2A:
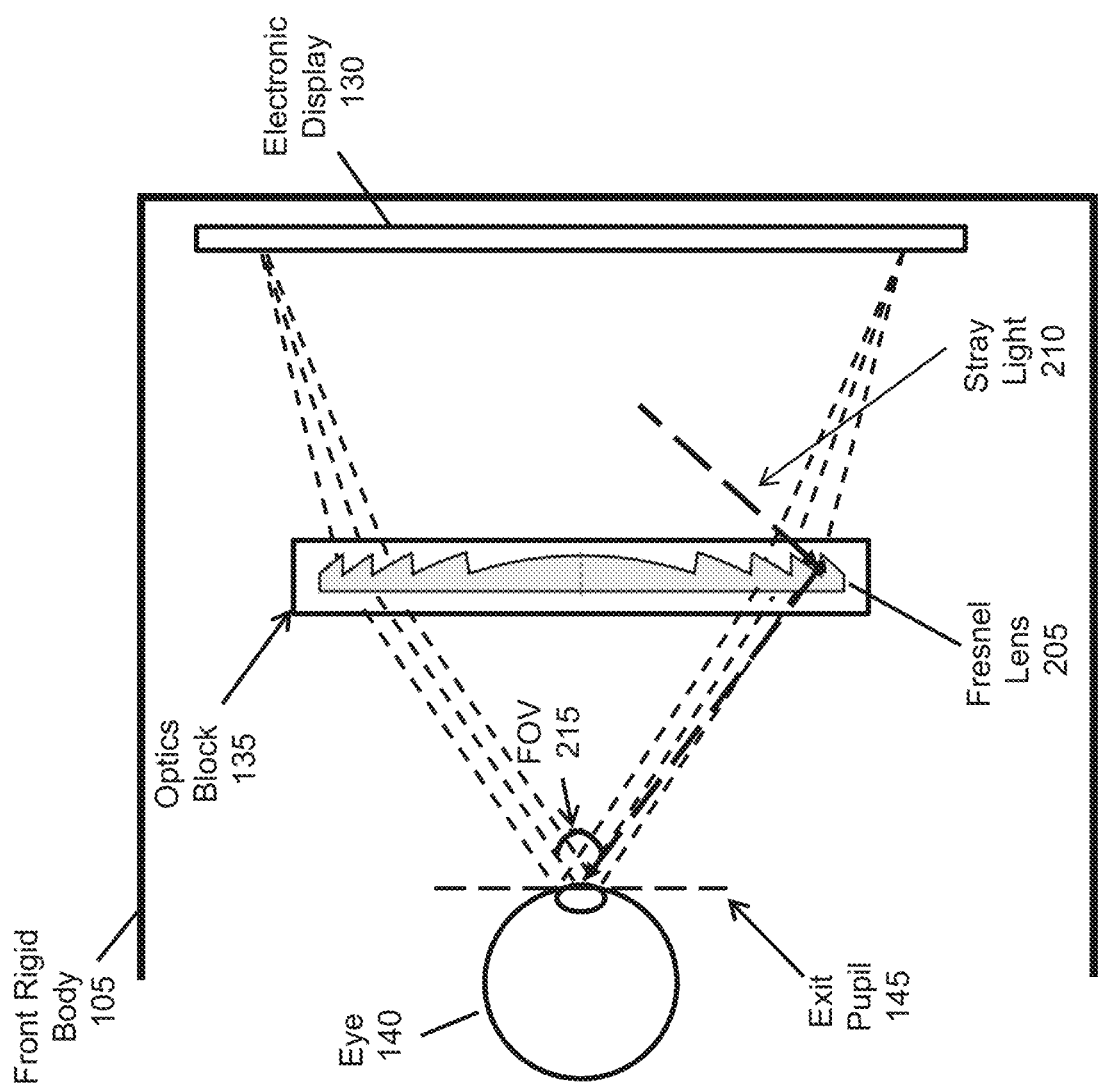
FIG. 2A is an illustration of a cross-sectional view of the NED including the optics block, according to an embodiment.

FIG. 2A is an illustration of a cross-sectional view of the NED 100 including the optics block 135, according to an embodiment. The eye 140 of the user can have a field of view 215.

As shown in FIG. 2A, a Fresnel lens 205 included in the optics block 135 can be configured to receive the image light emitted from the electronic display 130 and direct the image light to an eye-box associated with the exit pupil 145. The Fresnel lens 205 is a compact lens with a rotational symmetric structure having multiple annular segments. In one embodiment, the Fresnel lens 205 may be manufactured by segmenting a continuous curved surface of an ordinary lens into a plurality of segments and, after reducing the thickness of each segment, arranging the segments on a surface. As shown in FIG. 2A, the Fresnel lens 205 has a smooth surface on the side facing the exit pupil 145 and a discontinuous and faceted surface on the side facing the electronic display 130, i.e., the intended refracting surface of the lens.

The Fresnel lens 205 can be much thinner relative to a comparable conventional lens, thus allowing a substantial reduction in relative thickness, mass, and volume. For a VR NED system, it is advantageous to use the Fresnel lens 205 in order to make the optics block 135 thinner and lighter. The faceted and discontinuous nature of the intended refracting surface of the Fresnel lens 205, however, can contribute to stray light beams, such as stray light 210, within the NED 100. The stray light 210 can cause glare on the image formed at the eye of the user and can reduce the overall image contrast. In general, glare occurs when non-image forming stray light beams are incident on a focal surface. The stray light 210 can be caused by surface defects, dust, or any other object that might cause light to deviate from its intended image path.

The Fresnel lens 205 can emit many such non-image forming light beams as a result of its faceted and discontinuous nature of the intended refracting surface of the lens. Therefore, glare generated by stray light can be an issue for the NED 100 including the Fresnel lens 205. In particular and as discussed above, the Fresnel lens 205 can include many annular segments, each of the annular segments can include a refracting optical portion and a non-imaging portion referred to as a back-cut. These back-cuts are deliberate surface defects that enable the Fresnel lens 205 to be made very thin but contribute to the amount of glare in the NED 100. As shown in FIG. 2A, stray light 210, not from the electronic display 130 and incident on the back-cut portion of the Fresnel lens 205, scatters and falls upon the image formed at the eye 140 as off-field noise. The off-field noise contributes to the glare on the image.

Figure 2B:
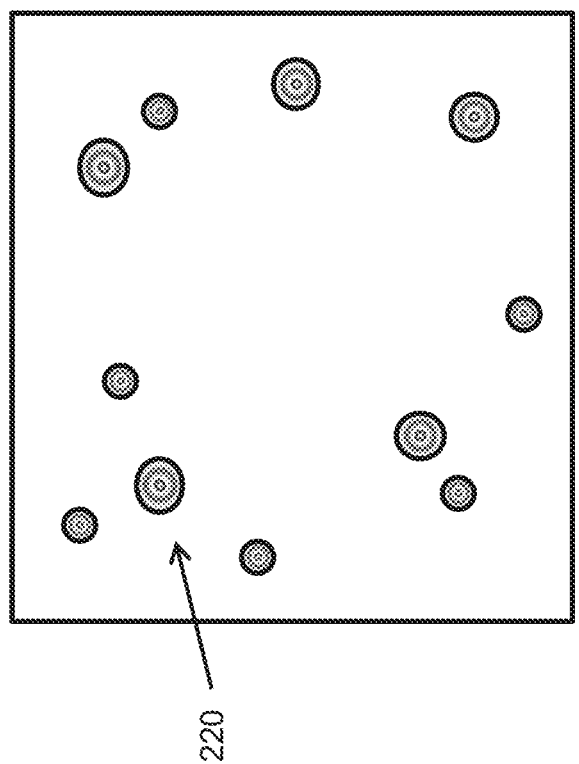
FIG. 2B is an illustration of glare on an image resulting from the stray light beams of FIG. 2A, according to an embodiment.

FIG. 2B is an illustration of glare on an image resulting from the stray light 210 of FIG. 2A, according to an embodiment. As discussed above, the light beams of the image light exiting the Fresnel lens 205 can include stray light 210. The stray light corresponds to glare dots 220 on the image, as shown in FIG. 2B.

Figure 3A:
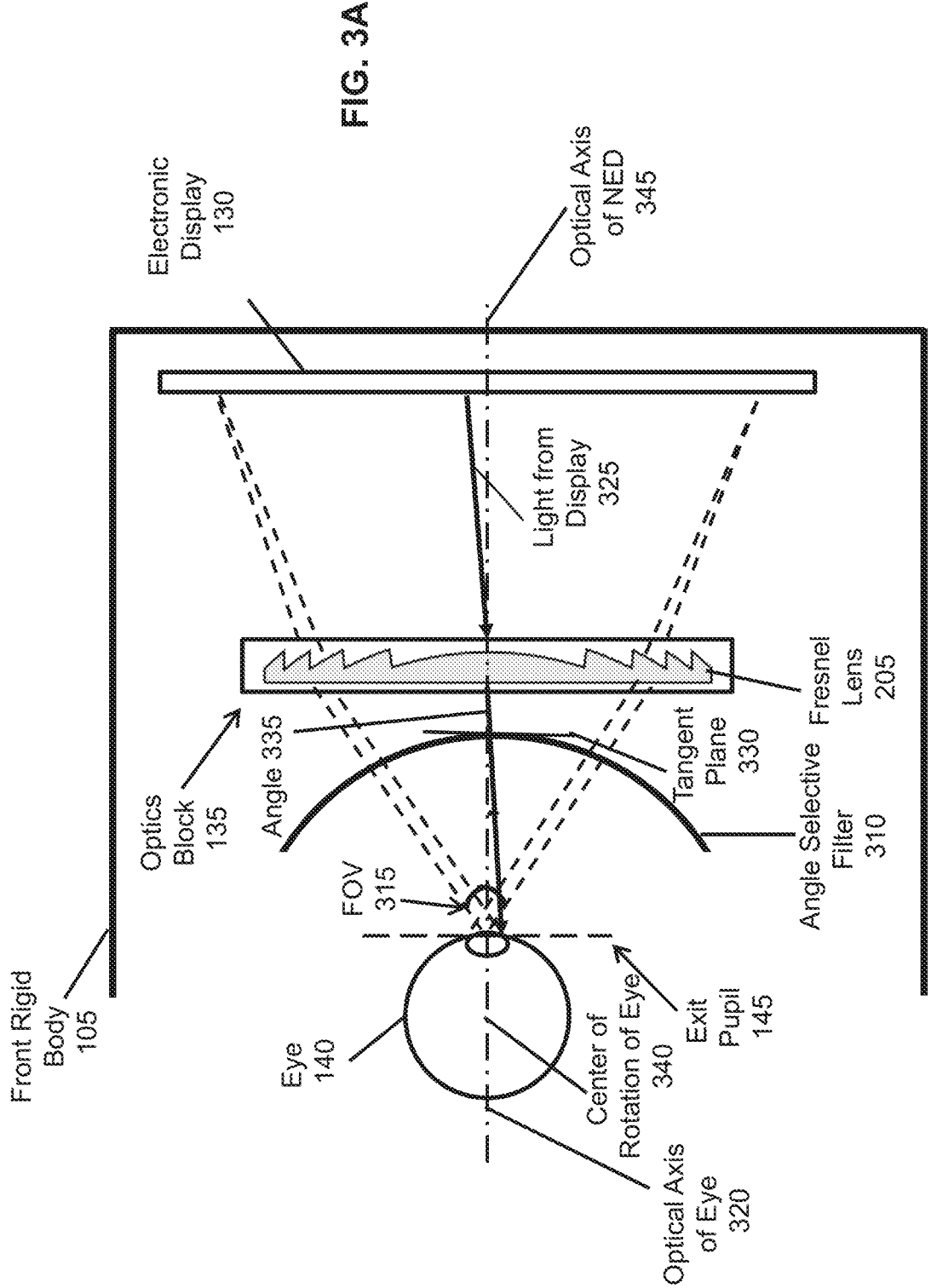

FIGS. 3A-3C are illustrations of a cross-sectional view of the NED 100 including the optics block 135 and an angle selective filter 310 configured to block stray light beams, according to various embodiments. The angle selective filter 310 is disposed between the optics block 135 and the exit pupil 145 of the NED 100.

The angle selective filter 310 is configured to filter out or block light beams of the image light, for example, stray light beams. Each of the blocked light beams has an angle of incidence on the curved surface of the angle selective filter 310 that is larger than or equal to a cut-off angle of incidence. Filtering out stray light beams reduces the glare on the image formed at the eye 140.

The cut-off angle of incidence can be configured to correspond to a visual field of the eye having a field of view (FOV) 315. In some embodiments, the visual field of the eye corresponds to an instantaneous view of the eye. For example, the instantaneous view of the eye (e.g. how much a user sees instantaneously looking forward) may correspond to a set of small viewing angles. The cut-off angle can be configured to correspond to the set of small viewing angles. Examples of the cut-off angle include 5 degrees, 10 degrees, 15 degrees, 20 degrees, 25 degrees, 30 degrees, etc. The angle selective filter 310 is thus configured to pass light beams incident on the angle selective filter 310 at angles smaller than the set of small viewing angles. The light beams incident on the angle selective filter 310 at angles larger than or equal to the cut-off angle are blocked by the angle selective filter 310. In particular, stray light beams having large angles of incidence are blocked by the angle selective filter 310. Therefore, the number of stray light beams reaching the eye 140 is significantly reduced when the angle selective filter 310 is disposed between the optics block 135 and the exit pupil 145.

As shown in FIG. 3A, when the optical axis 320 of the eye 140 is aligned with the optical axis 345 of the NED 100, light beams corresponding to light 325 emitted from the electronic display 105 pass through the angle selective filter 310. In the illustration of FIG. 3A, the angle of incidence of the light beams exiting the optics block 135 and corresponding to the light 325 is the angle 335 between the normal to the tangent plane 330 and the light beams. In the illustration, the angle of incidence of the light beams corresponding to the light 325 is smaller than the cut-off angle of the angle selective filter 310, and, therefore, the light beams corresponding to the light 325 are allowed to pass through the angle selective filter 310.

As shown in FIG. 3B, when the optical axis 320 of the eye 140 is aligned with the optical axis 345 of the NED 100, light beams corresponding to stray light 350 are blocked by the angle selective filter 310. In the illustration of FIG. 3B, the angle of incidence of the light beams exiting the optics block 135 and corresponding to the stray light 350 is the angle 355 between the normal to the tangent plane 330 and the light beams. In the illustration, the angle of incidence of the light beams is larger than the cut-off angle of the angle selective filter 310, and, therefore, the light beams corresponding to the stray light 350 are blocked by the angle selective filter 310.

The eye 140 rotates roughly around the center of rotation 340. When the eye 140 rotates to view a content scene off-axis of the optical axis 345 of NED 100, the optical axis 320 of eye changes orientation. In some embodiments, the angle selective filter 310 can include a spherical surface, where a center of the spherical surface corresponds to a center of rotation 340 of the eye 140. In this way, for each point on the surface of the angle selective filter 310, a tangent plane of the point is configured to be normal to an optical axis 320 of the eye 140 when the eye 140 rotates such that the optical axis 320 of the eye 140 aligns with the point. Consequently, for each point on the surface of the angle selective filter 310, when the optical axis 320 of the eye 140 is aligned with the point, the angle selective filter 310 is configured such that the angle of incidence of light beams incident on the curved surface at that point is equal to an angle between the light beams and the optical axis 320 of the eye. Therefore, the angle selective filter 310 is configured to have substantially the same cut-off angle at each point.

Accordingly, the angle selective filter 310 is configured to reduce a similar amount of stray light beams when the eye 140 rotates to change the orientation of the optical axis 320 of the eye 140. The similar reductions means the difference between the level of reduction of the stray light beams when the eye 140 rotates to different orientations are less than 5%, less than 10%, less than 15%, less than 20%, etc. Advantageously, as the eye 140 rotates around the center of rotation 340, the images resulting from image light emitted from the optics block 135 have a similar level of quality and the user can have a comfortable immersion viewing experience.

As shown in FIG. 3C, the eye 140 rotates to an orientation different than the illustrations in FIGS. 3A and 3B. The optical axis 320 of the eye 140 is thus no longer the same as the optical axis 345 of the NED 100. As discussed above, when the eye 140 rotates to the new orientation, the cut-off angle of the angle selective filter 310 at the point on the curved surface where the optical axis 320 intersects is substantially the same as when the optical axis 320 of the eye 140 is the same as the optical axis 345 of the NED 100.

In the illustration of FIG. 3C, light beams corresponding to light 365 emitted from the electronic display 105 pass through the angle selective filter 310. The angle of incidence of the light beams exiting the optics block 135 and corresponding to the light 365 is the angle 375 between the normal to the tangent plane 370 and the light beams. In the illustration, the angle of incidence of the light beams corresponding to the light 365 is smaller than the cut-off angle of the angle selective filter 310, and, therefore, the light beams corresponding to the light 365 are allowed to pass through the angle selective filter 310.

Light beams corresponding to stray light 380 are blocked by the angle selective filter 310. In the illustration of FIG. 3C, the angle of incidence of the light beams exiting the optics block 135 and corresponding to the stray light 380 is the angle 385 between the normal to the tangent plane 370 and the angle of the light beams. In the illustration, the angle of incidence of the light beams corresponding to the stray light 380 is larger than the cut-off angle of the angle selective filter 310, and, therefore, the light beams corresponding to the stray light 380 are blocked by the angle selective filter 310.

Figure 4:
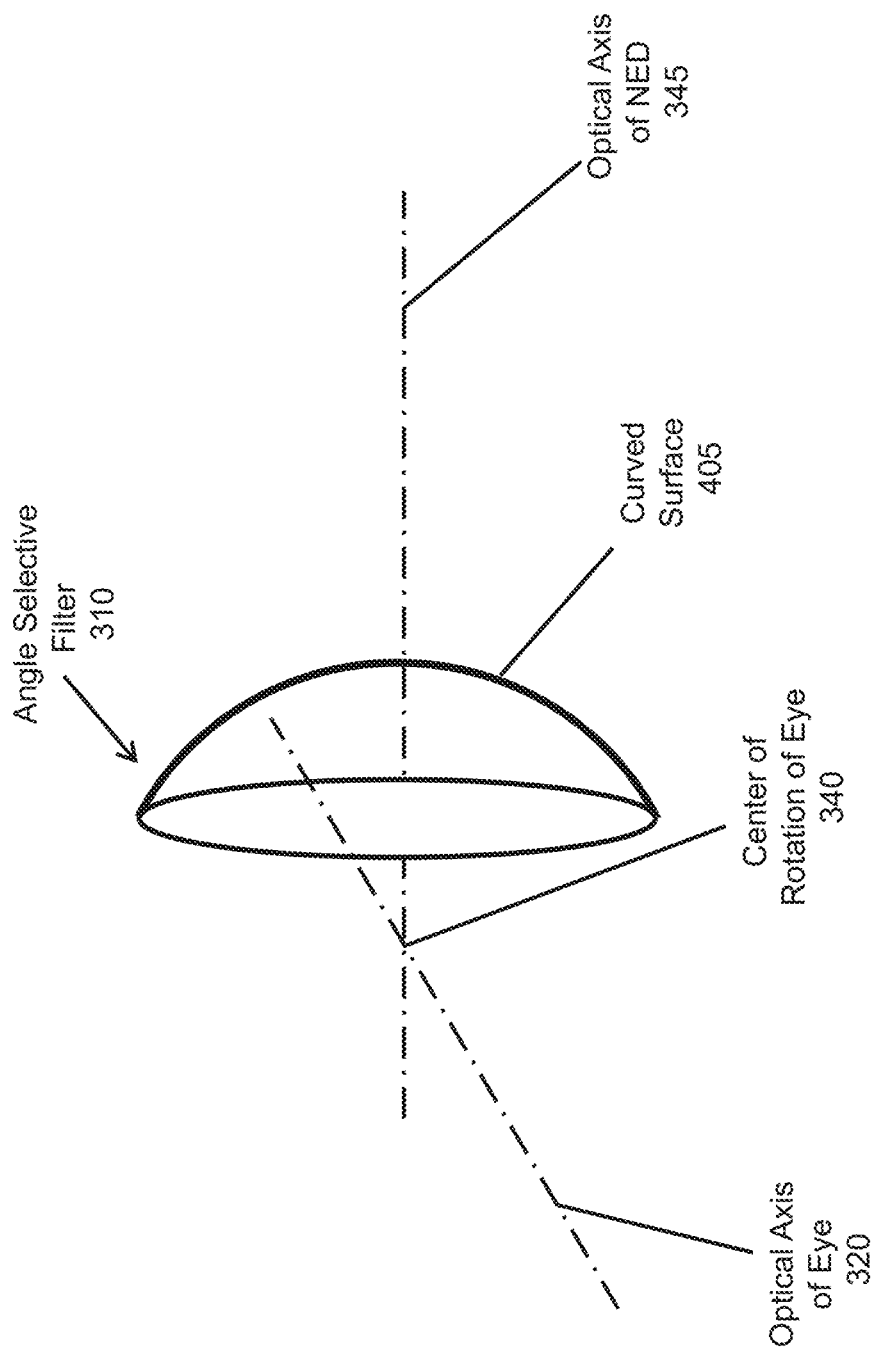
FIG. 4 is an illustration of a perspective view of the angle selective filter having a curved surface, according to an embodiment.

FIG. 4 is an illustration of a perspective view of the angle selective filter 310 having a curved surface 405, according to an embodiment. In some embodiments, the angle selective filter 310 can include a thin film multilayer filter. For example, the angle selective filter 310 can be a thin film or laminated filter configured to pass light beams with an angle of incidence less than a cut-off angle. In some embodiments, the angle selective filter 310 can include a set of louvers arranged concentrically. For example, a set of louvers could be used in concentric fashion to create the same effect of reducing light beams with an angle of incidence larger than the cut-off angle.

Figure 5:
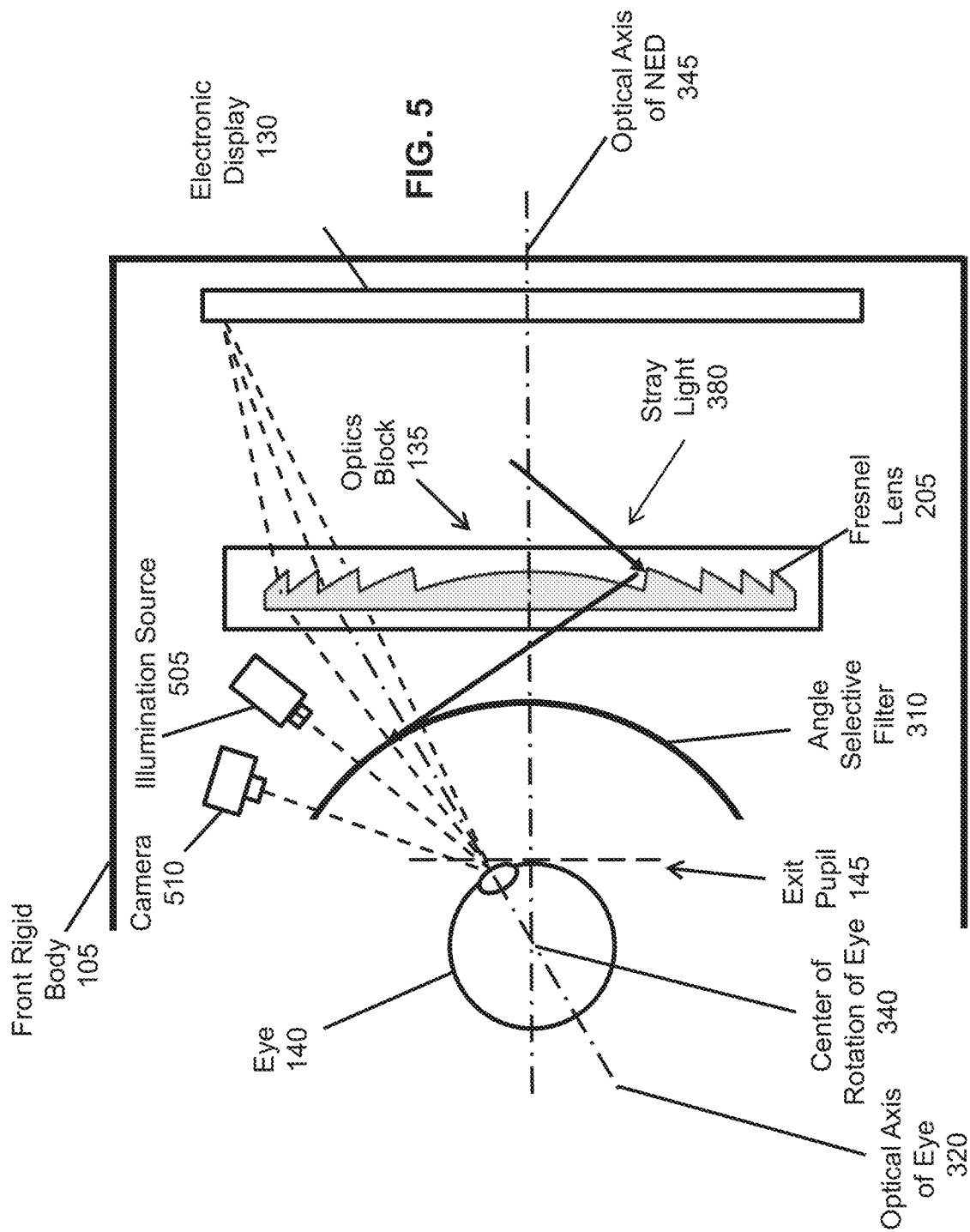
FIG. 5 is an illustration of a cross-sectional view of the NED including the optics block, the angle selective filter, and an eye tracking system, according to an embodiment.

FIG. 5 is an illustration of a cross-sectional view of the NED 100 including the optics block 135, the angle selective filter 310, and an eye tracking system, according to an embodiment. In some embodiments, the eye tracking system includes an illumination source 505 and a camera 510.

The illumination source 505 is configured to emit infrared light beams or near infrared light beams. The camera 510 is configured to receive or detect reflected light beams from the eye 140. The reflected light beams are received or detected by the camera 519 and analyzed to extract information about eye rotation, for example, from changes in the infrared light beams reflected by the eye 140. In one embodiment, the center of the curved surface of the angle selective filter 310 is adjustable and is determined based on one or more measurements performed by the eye tracking system.

Further, in the case of eye tracking, the angle selective filter 310 can be configured to pass infrared light beams or near infrared light beams for all or a much wider group of angles than visible light beams. As discussed above, the angle selective filter 310 is configured to filter out light beams of the image light in the visible light wavelength range with an angle of incidence on the curved surface larger than a first cut-off angle of incidence. The angle selective filter 310 can further be configured to allow light beams of the image light in the infrared or near infrared light wavelength range with an angle of incidence on the curved surface smaller than a second cut-off angle of incidence and larger than the first cut-off angle of incidence.

Figure 6:
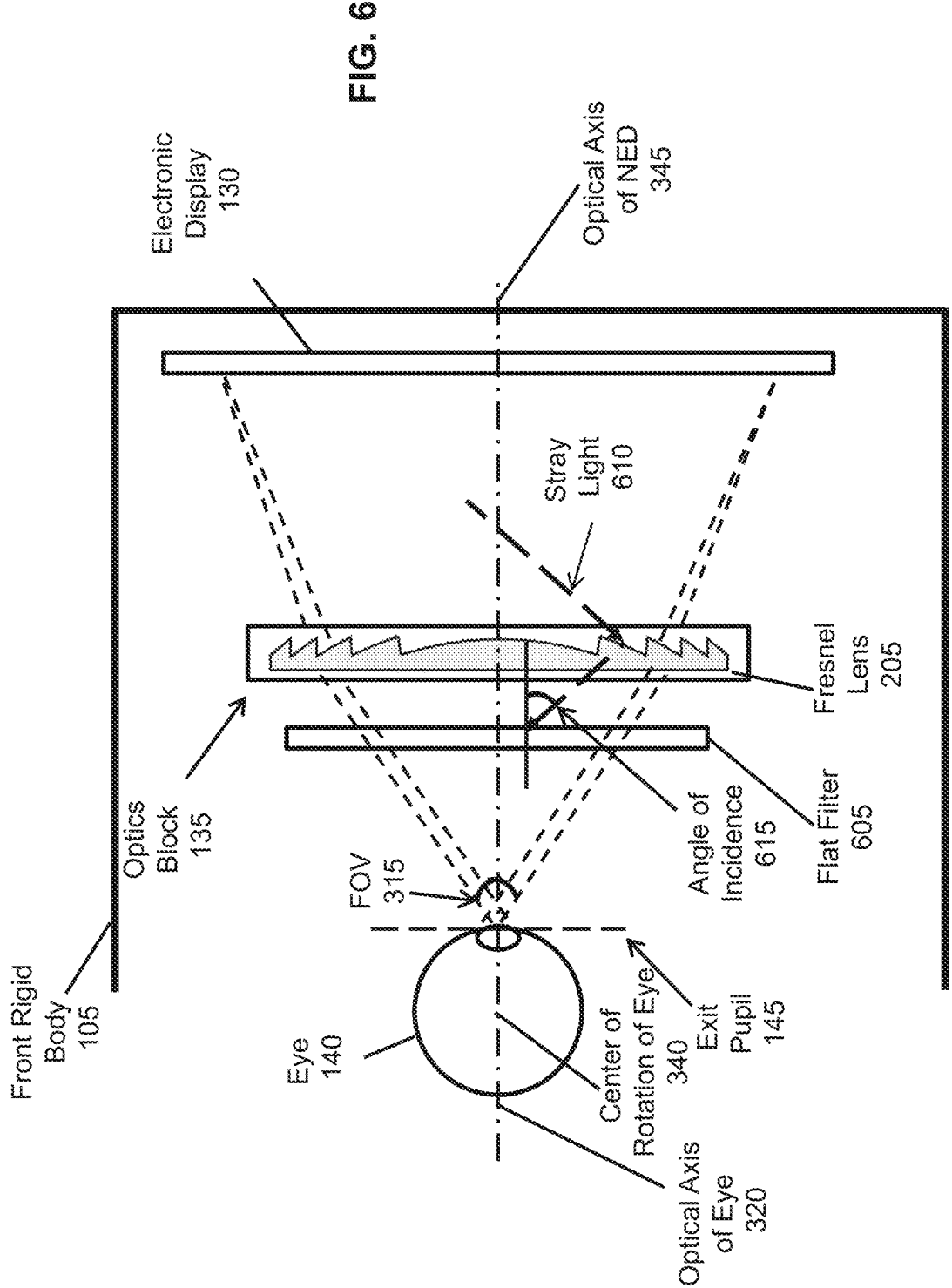
FIG. 6 is an illustration of a cross-sectional view of the NED including the optics block and a flat filter, according to an embodiment.

FIG. 6 is an illustration of a cross-sectional view of the NED 100 including the optics block 135 and a flat filter 605, according to an embodiment. The flat filter 605 is configured to filter out light beams of the image light, for example, stray light beams, with an angle of incidence on the surface of the flat filter 605 that is larger than or equal to a cut-off angle of incidence. As shown in FIG. 6, light beams corresponding to stray light 610 are blocked by the flat filter 605. In the illustration, the angle of incidence of the light beams exiting the optics block 135 and corresponding to the stray light 610 is larger than the cut-off angle.

Figure 7:
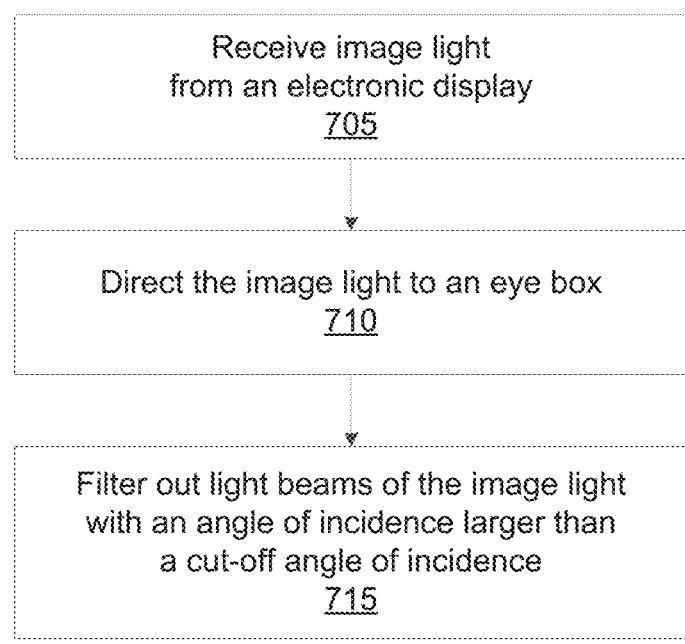
FIG. 7 is a flow diagram of a method for reducing stray light beams in the NED by using an angle selective filter having a curved surface, according to various embodiments of the present invention.

FIG. 7 is a flow diagram of a method 700 for reducing stray light beams in the NED 100 by using an angle selective filter having a curved surface, according to various embodiments of the present invention. Although the method steps are described in conjunction with the systems of FIGS. 1-6 and 8, persons skilled in the art will understand that any system configured to perform the method steps, in any order, is within the scope of the present invention.

The method 700 begins at step 705, where the optics block 135 receives image light of a content scene from an electronic display 130 of the NED 100. At step 710, the optics block 135 directs the image light to the eye-box associated with the exit pupil of the NED 100. At step 715, the angle selective filter 310, disposed between the optics block 135 and the exit pupil 145, filters out light beams of the image light having an angle of incidence larger than a cut-off angle of incidence. The filtered image light forms an image of the content scene at the eye of a user of the NED 100.

Example Architecture of a Near Eye Display System

Figure 8:
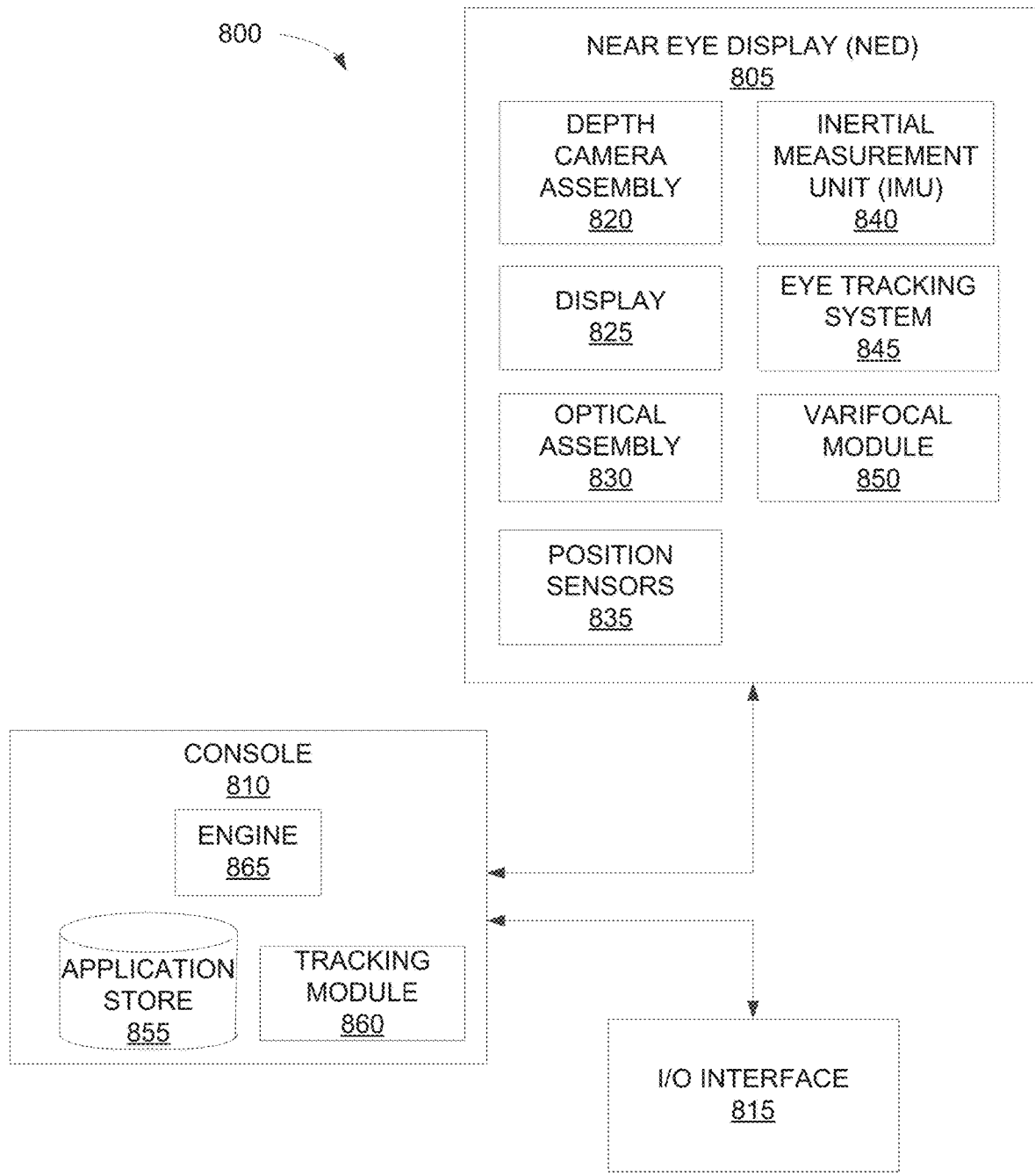
FIG. 8 is a block diagram of an embodiment of a NED system in which a console operates.

FIG. 8 is a block diagram of an embodiment of a near eye display (NED) system 800 in which a console 810 operates. The NED system 800 may operate in a virtual reality (VR) system environment, an augmented reality (AR) system environment, a mixed reality (MR) system environment, or some combination thereof. The NED system 800 shown in FIG. 8 comprises a NED 805 and an input/output (I/O) interface 815 that is coupled to the console 810. In one embodiment, the NED 805 may be the NED 100 discussed above in conjunction with FIGS. 1-7.

While FIG. 8 shows an example NED system 800 including one NED 805 and one I/O interface 815, in other embodiments any number of these components may be included in the NED system 800. For example, there may be multiple NEDs 805 that each has an associated I/O interface 815, where each NED 805 and I/O interface 815 communicates with the console 810. In alternative configurations, different and/or additional components may be included in the NED system 800. Additionally, various components included within the NED 805, the console 810, and the I/O interface 815 may be distributed in a different manner than is described in conjunction with FIG. 8 in some embodiments. For example, some or all of the functionality of the console 810 may be provided by the NED 805.

The NED 805 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 805 may also present audio content to a user. The NED 805 and/or the console 810 may transmit audio content to an external device via the I/O interface 815. The external device may include various forms of speaker systems and/or headphones. In various embodiments, the audio content is synchronized with visual content being displayed by the NED 805.

The NED 805 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 8, the NED 805 may include a depth camera assembly (DCA) 820, a display 825, an optical assembly 830, one or more position sensors 835, an inertial measurement unit (IMU) 840, an eye tracking system 845, and a varifocal module 850. In some embodiments, the display 825 and the optical assembly 830 can be integrated together into a projection assembly. Various embodiments of the NED 805 may have additional, fewer, or different components than those listed above. Additionally, the functionality of each component may be partially or completely encompassed by the functionality of one or more other components in various embodiments.

The DCA 820 captures sensor data describing depth information of an area surrounding the NED 805. The sensor data may be generated by one or a combination of depth imaging techniques, such as triangulation, structured light imaging, time-of-flight imaging, laser scan, and so forth. The DCA 820 can compute various depth properties of the area surrounding the NED 805 using the sensor data. Additionally or alternatively, the DCA 820 may transmit the sensor data to the console 810 for processing.

The DCA 820 includes an illumination source, an imaging device, and a controller. The illumination source emits light onto an area surrounding the NED 805. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 805, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The display 825 displays two-dimensional or three-dimensional images to the user in accordance with pixel data received from the console 810. In various embodiments, the display 825 comprises a single display or multiple displays (e.g., separate displays for each eye of a user). In some embodiments, the display 825 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the displays types may be incorporated in display 825 and used separately, in parallel, and/or in combination.

The optical assembly 830 magnifies image light received from the display 825, corrects optical errors associated with the image light, and presents the corrected image light to a user of the NED 805. The optical assembly 830 includes a plurality of optical elements. For example, one or more of the following optical elements may be included in the optical assembly 830: an aperture, a Fresnel lens, a convex lens, a concave lens, a filter, a reflecting surface, or any other suitable optical element that deflects, reflects, refracts, and/or in some way alters image light. Moreover, the optical assembly 830 may include combinations of different optical elements. In some embodiments, one or more of the optical elements in the optical assembly 830 may have one or more coatings, such as partially reflective or antireflective coatings. The optical assembly 830 can be integrated into a projection assembly, e.g., a projection assembly. In one embodiment, the optical assembly 830 includes the optics block 135, the angle selective filter 310, and/or the flat filter 605.

In operation, the optical assembly 830 magnifies and focuses image light generated by the display 825. In so doing, the optical assembly 830 enables the display 825 to be physically smaller, weigh less, and consume less power than displays that do not use the optical assembly 830. Additionally, magnification may increase the field of view of the content presented by the display 825. For example, in some embodiments, the field of view of the displayed content partially or completely uses a user's field of view. For example, the field of view of a displayed image may meet or exceed 810 degrees. In various embodiments, the amount of magnification may be adjusted by adding or removing optical elements.

In some embodiments, the optical assembly 830 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 825 is pre-distorted, and the optical assembly 830 corrects the distortion as image light from the display 825 passes through various optical elements of the optical assembly 830. In some embodiments, optical elements of the optical assembly 830 are integrated into the display 825 as a projection assembly that includes at least one waveguide coupled with one or more optical elements.

The IMU 840 is an electronic device that generates data indicating a position of the NED 805 based on measurement signals received from one or more of the position sensors 835 and from depth information received from the DCA 820. In some embodiments of the NED 805, the IMU 840 may be a dedicated hardware component. In other embodiments, the IMU 840 may be a software component implemented in one or more processors. In one embodiment, the IMU 840 is the same component as the IMU 115 of FIG. 1A and the position sensors 835 are the same components as the position sensors 120.

In operation, a position sensor 835 generates one or more measurement signals in response to a motion of the NED 805. Examples of position sensors 835 include: one or more accelerometers, one or more gyroscopes, one or more magnetometers, one or more altimeters, one or more inclinometers, and/or various types of sensors for motion detection, drift detection, and/or error detection. The position sensors 835 may be located external to the IMU 840, internal to the IMU 840, or some combination thereof.

Based on the one or more measurement signals from one or more position sensors 835, the IMU 840 generates data indicating an estimated current position of the NED 805 relative to an initial position of the NED 805. For example, the position sensors 835 include multiple accelerometers to measure translational motion (forward/back, up/down, left/right) and multiple gyroscopes to measure rotational motion (e.g., pitch, yaw, and roll). In some embodiments, the IMU 840 rapidly samples the measurement signals and calculates the estimated current position of the NED 805 from the sampled data. For example, the IMU 840 integrates the measurement signals received from the accelerometers over time to estimate a velocity vector and integrates the velocity vector over time to determine an estimated current position of a reference point on the NED 805. Alternatively, the IMU 840 provides the sampled measurement signals to the console 810, which analyzes the sample data to determine one or more measurement errors. The console 810 may further transmit one or more of control signals and/or measurement errors to the IMU 840 to configure the IMU 840 to correct and/or reduce one or more measurement errors (e.g., drift errors). The reference point is a point that may be used to describe the position of the NED 805. The reference point may generally be defined as a point in space or a position related to a position and/or orientation of the NED 805.

In various embodiments, the IMU 840 receives one or more parameters from the console 810. The one or more parameters are used to maintain tracking of the NED 805. Based on a received parameter, the IMU 840 may adjust one or more IMU parameters (e.g., a sample rate). In some embodiments, certain parameters cause the IMU 840 to update an initial position of the reference point so that it corresponds to a next position of the reference point. Updating the initial position of the reference point as the next calibrated position of the reference point helps reduce drift errors in detecting a current position estimate of the IMU 840.

In some embodiments, the eye tracking system 845 is integrated into the NED 805. The eye-tracking system 845 may comprise one or more illumination sources and an imaging device (camera). In operation, the eye tracking system 845 generates and analyzes tracking data related to a user's eyes as the user wears the NED 805. The eye tracking system 845 may further generate eye tracking information that may comprise information about a position of the user's eye, i.e., information about an angle of an eye-gaze.

In some embodiments, the varifocal module 850 is further integrated into the NED 805. The varifocal module 850 may be communicatively coupled to the eye tracking system 845 in order to enable the varifocal module 850 to receive eye tracking information from the eye tracking system 845. The varifocal module 850 may further modify the focus of image light emitted from the display 825 based on the eye tracking information received from the eye tracking system 845. Accordingly, the varifocal module 850 can reduce vergence-accommodation conflict that may be produced as the user's eyes resolve the image light. In various embodiments, the varifocal module 850 can be interfaced (e.g., either mechanically or electrically) with at least one optical element of the optical assembly 830.

In operation, the varifocal module 850 may adjust the position and/or orientation of one or more optical elements in the optical assembly 830 in order to adjust the virtual image projected by the optical assembly 830. In various embodiments, the varifocal module 850 may use eye tracking information obtained from the eye tracking system 845 to determine how to adjust one or more optical elements in the optical assembly 830. In some embodiments, the varifocal module 850 may perform foveated rendering of the image light based on the eye tracking information obtained from the eye tracking system 845 in order to adjust the resolution of the image light emitted by the display 825. In this case, the varifocal module 850 configures the display 825 to display a high pixel density in a foveal region of the user's eye-gaze and a low pixel density in other regions of the user's eye-gaze.

The I/O interface 815 facilitates the transfer of action requests from a user to the console 810. In addition, the I/O interface 815 facilitates the transfer of device feedback from the console 810 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 815 may include one or more input devices. Example input devices include: a keyboard, a mouse, a game controller, a joystick, and/or any other suitable device for receiving action requests and communicating the action requests to the console 810. In some embodiments, the I/O interface 815 includes an IMU 840 that captures calibration data indicating an estimated current position of the I/O interface 815 relative to an initial position of the I/O interface 815.

In operation, the I/O interface 815 receives action requests from the user and transmits those action requests to the console 810. Responsive to receiving the action request, the console 810 performs a corresponding action. For example, responsive to receiving an action request, console 810 may configure I/O interface 815 to emit haptic feedback onto an arm of the user. For example, console 815 may configure I/O interface 815 to deliver haptic feedback to a user when an action request is received. Additionally or alternatively, the console 810 may configure the I/O interface 815 to generate haptic feedback when the console 810 performs an action, responsive to receiving an action request.

The console 810 provides content to the NED 805 for processing in accordance with information received from one or more of: the DCA 820, the NED 805, and the I/O interface 815. In the embodiment shown in FIG. 8, the console 810 includes an application store 855, a tracking module 860, and an engine 865. In some embodiments, the console 810 may have additional, fewer, or different modules and/or components than those described in conjunction with FIG. 8. Similarly, the functions further described below may be distributed among components of the console 810 in a different manner than described in conjunction with FIG. 8.

The application store 855 stores one or more applications for execution by the console 810. An application is a group of instructions that, when executed by a processor, performs a particular set of functions, such as generating content for presentation to the user. For example, an application may generate content in response to receiving inputs from a user (e.g., via movement of the NED 805 as the user moves his/her head, via the I/O interface 815, etc.). Examples of applications include: gaming applications, conferencing applications, video playback applications, or other suitable applications.

The tracking module 860 calibrates the NED system 800 using one or more calibration parameters. The tracking module 860 may further adjust one or more calibration parameters to reduce error in determining a position and/or orientation of the NED 805 or the I/O interface 815. For example, the tracking module 860 may transmit a calibration parameter to the DCA 820 in order to adjust the focus of the DCA 820. Accordingly, the DCA 820 may more accurately determine positions of structured light elements reflecting off of objects in the environment. The tracking module 860 may also analyze sensor data generated by the IMU 840 in determining various calibration parameters to modify. Further, in some embodiments, if the NED 805 loses tracking of the user's eye, then the tracking module 860 may re-calibrate some or all of the components in the NED system 800. For example, if the DCA 820 loses line of sight of at least a threshold number of structured light elements projected onto the user's eye, the tracking module 860 may transmit calibration parameters to the varifocal module 850 in order to re-establish eye tracking.

The tracking module 860 tracks the movements of the NED 805 and/or of the I/O interface 815 using information from the DCA 820, the one or more position sensors 835, the IMU 840 or some combination thereof. For example, the tracking module 860 may determine a reference position of the NED 805 from a mapping of an area local to the NED 805. The tracking module 860 may generate this mapping based on information received from the NED 805 itself. The tracking module 860 may also utilize sensor data from the IMU 840 and/or depth data from the DCA 820 to determine references positions for the NED 805 and/or I/O interface 815. In various embodiments, the tracking module 860 generates an estimation and/or prediction for a subsequent position of the NED 805 and/or the I/O interface 815. The tracking module 860 may transmit the predicted subsequent position to the engine 865.

The engine 865 generates a three-dimensional mapping of the area surrounding the NED 805 (i.e., the "local area") based on information received from the NED 805. In some embodiments, the engine 865 determines depth information for the three-dimensional mapping of the local area based on depth data received from the DCA 820 (e.g., depth information of objects in the local area). In some embodiments, the engine 865 calculates a depth and/or position of the NED 805 by using depth data generated by the DCA 820. In particular, the engine 865 may implement various techniques for calculating the depth and/or position of the NED 805, such as stereo based techniques, structured light illumination techniques, time-of-flight techniques, and so forth. In various embodiments, the engine 865 uses depth data received from the DCA 820 to update a model of the local area and to generate and/or modify media content based in part on the updated model.

The engine 865 also executes applications within the NED system 800 and receives position information, acceleration information, velocity information, predicted future positions, or some combination thereof, of the NED 805 from the tracking module 860. Based on the received information, the engine 865 determines various forms of media content to transmit to the NED 805 for presentation to the user. For example, if the received information indicates that the user has looked to the left, the engine 865 generates media content for the NED 805 that mirrors the user's movement in a virtual environment or in an environment augmenting the local area with additional media content. Accordingly, the engine 865 may generate and/or modify media content (e.g., visual and/or audio content) for presentation to the user. The engine 865 may further transmit the media content to the NED 805. Additionally, in response to receiving an action request from the I/O interface 815, the engine 865 may perform an action within an application executing on the console 810. The engine 805 may further provide feedback when the action is performed. For example, the engine 865 may configure the NED 805 to generate visual and/or audio feedback and/or the I/O interface 815 to generate haptic feedback to the user.

In some embodiments, based on the eye tracking information (e.g., orientation of the user's eye) received from the eye tracking system 845, the engine 865 determines a resolution of the media content provided to the NED 805 for presentation to the user on the display 825. The engine 865 may adjust a resolution of the visual content provided to the NED 805 by configuring the display 825 to perform foveated rendering of the visual content, based at least in part on a direction of the user's gaze received from the eye tracking system 845. The engine 865 provides the content to the NED 805 having a high resolution on the display 825 in a foveal region of the user's gaze and a low resolution in other regions, thereby reducing the power consumption of the NED 805. In addition, using foveated rendering reduces a number of computing cycles used in rendering visual content without compromising the quality of the user's visual experience. In some embodiments, the engine 865 can further use the eye tracking information to adjust a focus of the image light emitted from the display 825 in order to reduce vergence-accommodation conflicts.

A projection assembly integrated into a near-eye-display (NED) is presented herein. The NED 800 may be part of, e.g., a virtual reality (VR) system, an augmented reality (AR) system, a mixed reality (MR) system, or some combination thereof. The NED may also be referred to as a head-mounted display (HMD). In some embodiments, the projection assembly of the NED includes a source assembly, a waveguide, a main optic, and an optional focusing element. The source assembly generates image light that is coupled into the waveguide. The image light is expanded in at least one dimension and out-coupled from the waveguide. The focusing element (e.g., liquid crystal lens) may be located between the waveguide and the main optic. The focusing element can, e.g., add or subtract optical power to adjust focus of the image light. The main optic receives light from a local area surrounding the NED and combines that light with the image light received either directly from the waveguide or from the focusing element. The combined light is provided to an eye-box of a user.

1. In some embodiments, a near eye display (NED) comprises an electronic display configured to output image light, an optical element configured to direct a plurality of light beams associated with the image light to an eye-box, and an angle selective filter comprising a curved surface, the angle selective filter configured to filter out one or more light beams of the plurality of light beams, each of the one or more light beams having an angle of incidence on the curved surface that is larger than a first cut-off angle of incidence.

2. The NED of clause 1, wherein the curved surface comprises a spherical surface.

3. The NED of clauses 1 or 2, wherein a center of the spherical surface corresponds to a center of rotation of an eye.

4. The NED of any of clauses 1-3, wherein, for each point on the curved surface, a tangent plane of the point is configured to be normal to an optical axis of an eye when the optical axis of the eye aligns with the point.

5. The NED of any of clauses 1-4, wherein the angle selective filter comprises a thin film multilayer filter.

6. The NED of any of clauses 1-5, wherein the angle selective filter comprises a set of louvers arranged concentrically.

7. The NED of any of clauses 1-6, wherein the one or more light beams include at least one stray light beam.

8. The NED of any of clauses 1-7, wherein the first cut-off angle of incidence is between a range comprising 45-55 degrees.

9. The NED of any of clauses 1-8, wherein the angle selective filter is disposed between the optical element and an exit pupil of the NED.

10. The NED of any of clauses 1-9, wherein the first cut-off angle of incidence corresponds to a visual field of an eye of a user of the NED.

11. The NED of any of clauses 1-10, further comprising an eye tracking system, the eye tracking system comprises a light source in the near infrared wavelength range, wherein the angle selective filter is further configured to allow a light beam in the near infrared wavelength range with an angle of incidence on the curved surface larger than the first cut-off angle of incidence.

12. The NED of any of clauses 1-11, wherein a center of the curved surface is adjustable and determined based on a measurement from the eye tracking system.

13. In some embodiments, a near eye display (NED) comprises an electronic display configured to output image light, a Fresnel lens configured to direct a plurality of light beams associated with the image light to an eye-box, wherein the plurality of light beams exiting the Fresnel lens includes one or more stray light beams, and an angle selective filter comprising a curved surface, the angle selective filter configured to filter out at least one of the one or more stray light beams, the at least one of the one or more stray light beams having an angle of incidence on the curved surface that is larger than a first cut-off angle of incidence.

14. The NED of clause 13, wherein the curved surface comprises a spherical surface.

15. The NED of clauses 13 or 14, wherein a center of the spherical surface corresponds to a center of rotation of an eye.

16. The NED of any of clauses 13-15, wherein, for each point on the curved surface, a tangent plane of the point is configured to be normal to an optical axis of an eye when the optical axis of the eye aligns with the point.

17. The NED of any of clauses 13-16, wherein the angle selective filter is disposed between the Fresnel lens and an exit pupil of the NED.

18. In some embodiments, a method comprises receiving, from an electronic display, image light associated with a content scene, filtering out, by an angle selective filter, one or more light beams of the image light having an angle of incidence larger than a first cut-off angle of incidence, and forming an image of the content scene based on filtered light beams exiting the angle selective filter.

19. The method of clause 18, wherein the angle selective filter comprises a spherical surface, and a center of the spherical surface corresponds to a center of rotation of an eye.

20. The method of clauses 18 or 19, wherein, for each point on the curved surface, a tangent plane of the point is configured to be normal to an optical axis of an eye when the optical axis of the eye aligns with the point.

Any and all combinations of any of the claim elements recited in any of the claims and/or any elements described in this application, in any fashion, fall within the contemplated scope of the present invention and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figure s illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figure s. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A near eye display (NED) comprising:
an electronic display configured to output light associated with an image;
an optical element configured to direct the light associated with the image to an eye-box; and
an angle-selective filter disposed between the optical element and an exit pupil of the NED, the angle-selective filter comprising a curved surface, a tangent plane of each point on the curved surface being configured to be normal to an optical axis of an eye when the optical axis aligns with the point, and the angle-selective filter being configured to:
filter out the light associated with the image that is incident on the curved surface with angles of incidence larger than or equal to a first cut-off angle of incidence, and
allow to pass through a remainder of the light associated with the image that is incident on the curved surface with angles of incidence smaller than the first cut-off angle of incidence.

2. The NED of claim 1, wherein the curved surface comprises a spherical surface.

3. The NED of claim 2, wherein a center of the spherical surface corresponds to a center of rotation of an eye.

4. The NED of claim 1, wherein the angle-selective filter comprises a thin film multilayer filter.

5. The NED of claim 1, wherein the angle-selective filter comprises a set of louvers arranged concentrically.

6. The NED of claim 1, wherein the light associated with the image that is incident on the curved surface with angles of incidence larger than or equal to the first cut-off angle of incidence includes stray light.

7. The NED of claim 1, wherein the first cut-off angle of incidence is between a range comprising 45-55 degrees.

8. The NED of claim 1, wherein the first cut-off angle of incidence corresponds to a visual field of an eye of a user of the NED.

9. The NED of claim 1, further comprising an eye tracking system, the eye tracking system comprising a light source in the near infrared wavelength range, wherein the angle-selective filter is further configured to allow to pass through light in the near infrared wavelength range with angles of incidence on the curved surface larger than the first cut-off angle of incidence.

10. The NED of claim 9, wherein a center of the curved surface is adjustable and determined based on a measurement from the eye tracking system.

11. The NED of claim 1, wherein the angle-selective filter is further configured to allow to pass through infrared light having angles of incidence on the curved surface larger than the first cut-off angle of incidence.

12. A near eye display (NED) comprising:
an electronic display configured to output light associated with an image;
a Fresnel lens configured to direct the light associated with the image to an eye-box; and
an angle-selective filter disposed between the Fresnel lens and an exit pupil of the NED, the angle-selective filter comprising a curved surface, a tangent plane of each point on the curved surface being configured to be normal to an optical axis of an eye when the optical axis aligns with the point, and the angle-selective filter being configured to:
filter out the light associated with the image that has passed through the Fresnel lens and is incident on the curved surface with angles of incidence larger than or equal to a first cut-off angle of incidence, and
allow to pass through a remainder of the light associated with the image that has passed through the Fresnel lens and is incident on the curved surface with angles of incidence smaller than the first cut-off angle of incidence.

13. The NED of claim 12, wherein the curved surface comprises a spherical surface.

14. The NED of claim 13, wherein a center of the spherical surface corresponds to a center of rotation of an eye.

15. The NED of claim 12, wherein the angle-selective filter is further configured to allow to pass through infrared light having angles of incidence on the curved surface larger than the first cut-off angle of incidence.

16. A method comprising:
   emitting, by an electronic display, light associated with a content scene;
   filtering out, by an angle-selective filter that is disposed between an optical element and an exit pupil of a near eye display (NED) and that comprises a curved surface, the light associated with the content scene that is incident on the curved surface with angles of incidence larger than or equal to a first cut-off angle of incidence, wherein a tangent plane of each point on the curved surface is configured to be normal to an optical axis of an eye when the optical axis aligns with the point;
   passing through, by the angle-selective filter, a remainder of the light associated with the content scene that is incident on the curved surface of the angle-selective filter with angles of incidence smaller than the first cut-off angle of incidence; and
   forming an image of the content scene based on filtered light exiting the angle-selective filter.

17. The method of claim 16, wherein the angle-selective filter comprises a spherical surface, and a center of the spherical surface corresponds to a center of rotation of an eye.

18. The method of claim 16, further comprising allowing, by the angle-selective filter, infrared light having angles of incidence larger than the first cut-off angle of incidence to pass.

* * * * *